United States Patent
Kowalchuk et al.

(10) Patent No.: US 8,714,344 B2
(45) Date of Patent: May 6, 2014

(54) APPARATUS FOR RECOLLECTING RESIDUAL COMMODITY FROM A FILL HOPPER OF AN AIR SEEDER FILLING SYSTEM

(75) Inventors: Trevor Kowalchuk, Saskatoon (CA); Kevin Hall, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 166 days.

(21) Appl. No.: 13/156,634

(22) Filed: Jun. 9, 2011

(65) Prior Publication Data

US 2012/0312662 A1    Dec. 13, 2012

(51) Int. Cl.
- *B65G 33/24* (2006.01)
- *B65G 33/14* (2006.01)
- *B65B 1/04* (2006.01)
- *B67C 11/04* (2006.01)

(52) U.S. Cl.
USPC ............... 198/657; 198/550.01; 198/550.6; 198/550.1; 198/671

(58) Field of Classification Search
USPC ........ 198/550.01, 550.2, 550.3, 550.6, 550.1, 198/658, 671, 657
See application file for complete search history.

(56) References Cited

U.S. PATENT DOCUMENTS

| | | | |
|---|---|---|---|
| 200,149 A | 2/1878 | Newman | |
| 1,863,968 A | 6/1932 | Dearing | |
| 2,194,144 A | 3/1940 | Gill | |
| 2,310,592 A | 2/1943 | Noble | |
| 3,134,478 A * | 5/1964 | Haen et al. | 198/525 |
| 3,675,367 A * | 7/1972 | Amburn | 198/657 |
| 4,963,066 A * | 10/1990 | Boppart | 414/376 |
| 6,209,880 B1 | 4/2001 | Turnwald et al. | |
| 6,810,823 B2 | 11/2004 | Mariman et al. | |
| 2006/0131337 A1 | 6/2006 | Mertins | |
| 2010/0108470 A1 * | 5/2010 | Grose et al. | 198/671 |

FOREIGN PATENT DOCUMENTS

JP     01104512 A    4/1989

* cited by examiner

*Primary Examiner* — Gene Crawford
*Assistant Examiner* — Matthew Marotta
(74) *Attorney, Agent, or Firm* — Rebecca L. Henkel

(57) ABSTRACT

A hopper of a commodity conveyor apparatus for use with an agricultural implement has a bin configured to hold a volume of a granular commodity. The bin is movable between a first position at which the bin can be loaded with the granular commodity and a second position at which residual granular commodity can be recovered from the bin. The hopper further has a fill opening formed in the bin and adapted for loading the granular commodity into the bin when the bin is in the first position. A discharge opening is configured to be flow-coupled to the commodity conveyor apparatus and a container is removably attached to the bin for recovering the residual granular commodity from the bin when the bin is in the second position.

20 Claims, 5 Drawing Sheets

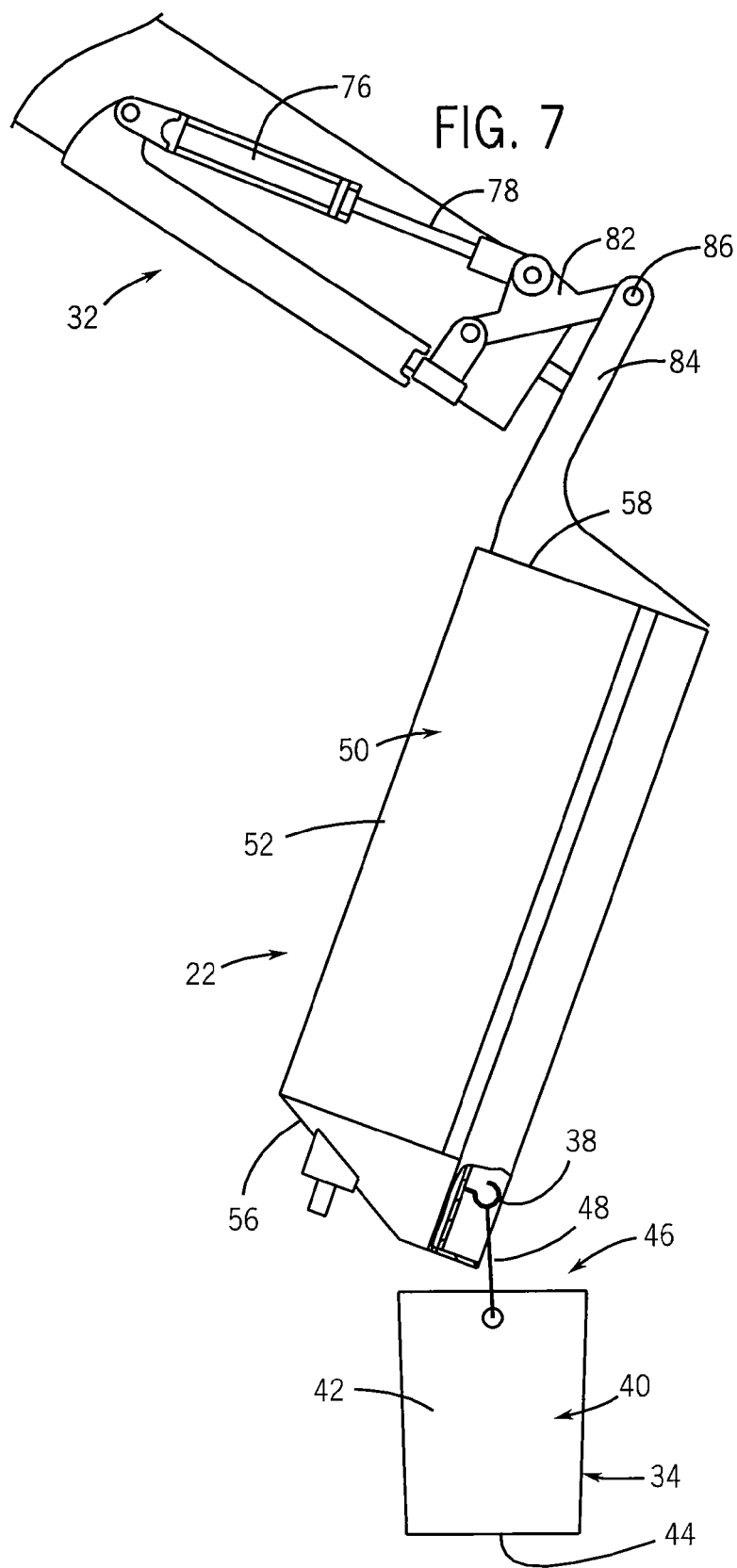

APPARATUS FOR RECOLLECTING RESIDUAL COMMODITY FROM A FILL HOPPER OF AN AIR SEEDER FILLING SYSTEM

BACKGROUND OF THE INVENTION

The present invention relates generally to agricultural implements and, more particularly, to an apparatus for recollecting residual commodity from a fill hopper of an air seeder filling system.

An air seeder is an agricultural implement that is commonly used to plant usually a seed crop in a large field. Air seeders typically have centrally located hoppers for seed and fertilizer which distributes them through an air stream to individual seed rows. It is convenient to fill, easy to clean out and move. Any crop that can be grown from seeds—which might vary is size from oilseeds to corn, can be sewn by an air seeder.

The seed and fertilizer hoppers are usually carried on a large cart located behind or in front of the seeder. The air stream is created by a high capacity fan mounted on the cart which blows air through pipes located under the grain and fertilizer tank. Seed and fertilizer are metered out from the hoppers by a meter wheel that is turning in a ratio set by the operator for the proper seed rate or seed density. The seeds enter the pipe in the airstream and follow the pipes which terminate in the seedbed. Openers pulled through the soil make the opening where the seeds are placed. They are made of steel in the shape of points, discs or cultivator shovels. Once placed in the seed bed, the air is blown out the opening in the soil and the seed and fertilizer remain. The seeder can then pack the soil tight to retain moisture near the seed and harrow the furrows so the field is not rough.

A typical air seeder has an agricultural commodity cart ("air cart") comprising at least one, and commonly two, three or more tanks for carrying various agricultural products like seed and fertilizer. Although not always present, commonly there is a conveyor mounted on the cart for transferring agricultural product ("commodity") from transport vehicles into the tanks. It is commonly seen as more convenient to mount a conveyor on the cart rather than on each transport vehicle, or maneuver a portable conveyor as a separate implement altogether.

The conveyor is typically mounted on a pivot mechanism configured to allow it to be moved from a transport position, where the bottom end of the conveyor is raised for transport, to an operating position where the bottom end is lowered to receive a commodity from the transport vehicle, and is typically resting on the ground. The pivot mechanism also allows the conveyor to be maneuvered so that a spout on the upper discharge end of the conveyor can be maneuvered to direct the commodity from the conveyor into the filling hatch for each tank. Cart loading conveyors commonly include a hopper at the bottom intake end to receive agricultural product from the transport vehicle. Conventional cart conveyors typically comprise simply a straight tube with an auger inside to convey the product, and the hopper is simply mounted on the lower end.

It is generally desirable to clean out the hopper when changing from one agricultural product to another in order to minimize contamination of the tanks with different agricultural products. On conventional cart conveyors, it is often possible to simply rotate the hopper on the conveyor tube such that the hopper is oriented downward. The auger can then be rotated in reverse so that material in the tube falls out of the lower end of the tube and into the inverted hopper and onto the ground. Other approaches include a hopper constructed with a cleanout port in the bottom of the hopper so that the auger can be reversed and the majority of material will fall out the cleanout port onto the ground. Some manual pushing of material is typically required to completely clean out the hopper.

These conventional approaches to emptying the fill hopper are generally effective in removing the residual commodity, these approaches are wasteful in that the residual product is simply casted onto the ground. To avoid this waste, many end-users will place a pail or similar collector on the ground and raise the fill hopper above the pail. To empty to the residual commodity into the pail, the fill hopper must be reoriented, i.e., tilted, so that the residual commodity runs out of the fill hopper and into the pail. This tilting of the fill hopper can be laborious and awkward as the fill hopper is generally heavy and bulky and, thus, difficult to maneuver. And, depending on the amount of residual commodity in the fill hopper, repositioning the fill hopper can be particularly cumbersome. Similarly, the pail, which is commonly a larger container, i.e., 20 L, can also be difficult to maneuver.

SUMMARY OF THE INVENTION

The present invention is directed to a fill hopper for an air seeder conveyor. The fill hopper is configured such that a pail can be removably mounted to the fill hopper. The pail mounts to the fill hopper so that when the fill hopper is raised and rotated, the pail will move with the fill hopper.

A number of different mounting structures may be used to removably mount the pail to the hopper. In one embodiment, the hopper has hooks that enable the bail of the pail to be hung on the hopper. The hooks are positioned such that the pail is substantially horizontal, i.e., parallel to the base of the hopper, when the hopper is in the being-filled ("operating") position. The hooks are positioned so that the pail sits tightly against the sidewall of the hopper when the hopper is in the operating position. When the hopper is rotated to an upright position, the pail remains hooked to the hopper and thus rotated from the horizontal position referenced above to a vertical or upright position. In this position, the residual commodity from the hopper will empty into the pail. After the fill hopper is empty, slack between the pail and fill hopper can be introduced by lowering the conveyor slightly and unhooking the bail from the hopper. The pail can then be emptied in a commodity saving fashion and reconnected to the fill hopper or a new pail could be hooked onto the fill hopper.

Therefore, in accordance with one aspect of the invention, a hopper of a commodity conveyor apparatus for use with an agricultural implement is provided. The hopper has a bin configured to hold a volume of a granular commodity. The bin is movable between a first position at which the bin can be loaded with the granular commodity and a second position at which residual granular commodity can be recovered from the bin. The hopper further has a fill opening formed in the bin and adapted for loading the granular commodity into the bin when the bin is in the first position. A discharge opening is configured to be flow-coupled to the commodity conveyor apparatus and a pail is removably attached to the bin for recovering the residual granular commodity from the bin when the bin is in the second position.

In accordance with another aspect of the invention, a commodity conveying apparatus for use with an air seeding implement is provided. The apparatus comprises a conveyor having an intake end for receiving a granular commodity and a discharge end for passing the granular commodity into a seed hopper of the air seeding implement. A feed hopper is pivotally attached to the discharge end of the conveyor, and is pivotal between a commodity conveying position and a commodity recapture position that is upright relative to the commodity conveying position. The apparatus further comprises a bucket having a handle and a catch that captures the handle for removably attaching the bucket to the feed hopper. The catch maintains attachment of the bucket to the feed hopper when the feed hopper is pivoted from the conveying position to the recapture position.

The invention may also be embodied in a method. The method is directed to recapturing residual granular commodity from a feed hopper of a conveying apparatus of an air seeding implement, and comprises attaching a pail to the feed hopper. The pail has an annular wall extending between an open top and a closed bottom surface collectively defining an annular interior. The method also includes tilting the feed hopper to an inclined position in which the closed bottom surface of the pail rests atop the ground and residual granular commodity in the feed hopper falls through the open top of the pail and into the annular interior of the pail.

Various other features, objects and advantages of the present invention will be made apparent from the following detailed description and the drawings.

BRIEF DESCRIPTION OF THE DRAWINGS

The drawings illustrate one preferred embodiment presently contemplated for carrying out the invention.

In the Drawings:

FIG. 7 is a side elevation view of the conveyor apparatus with the fill hopper further rotated to empty residual commodity into the pail.

DETAILED DESCRIPTION

Figure 1:
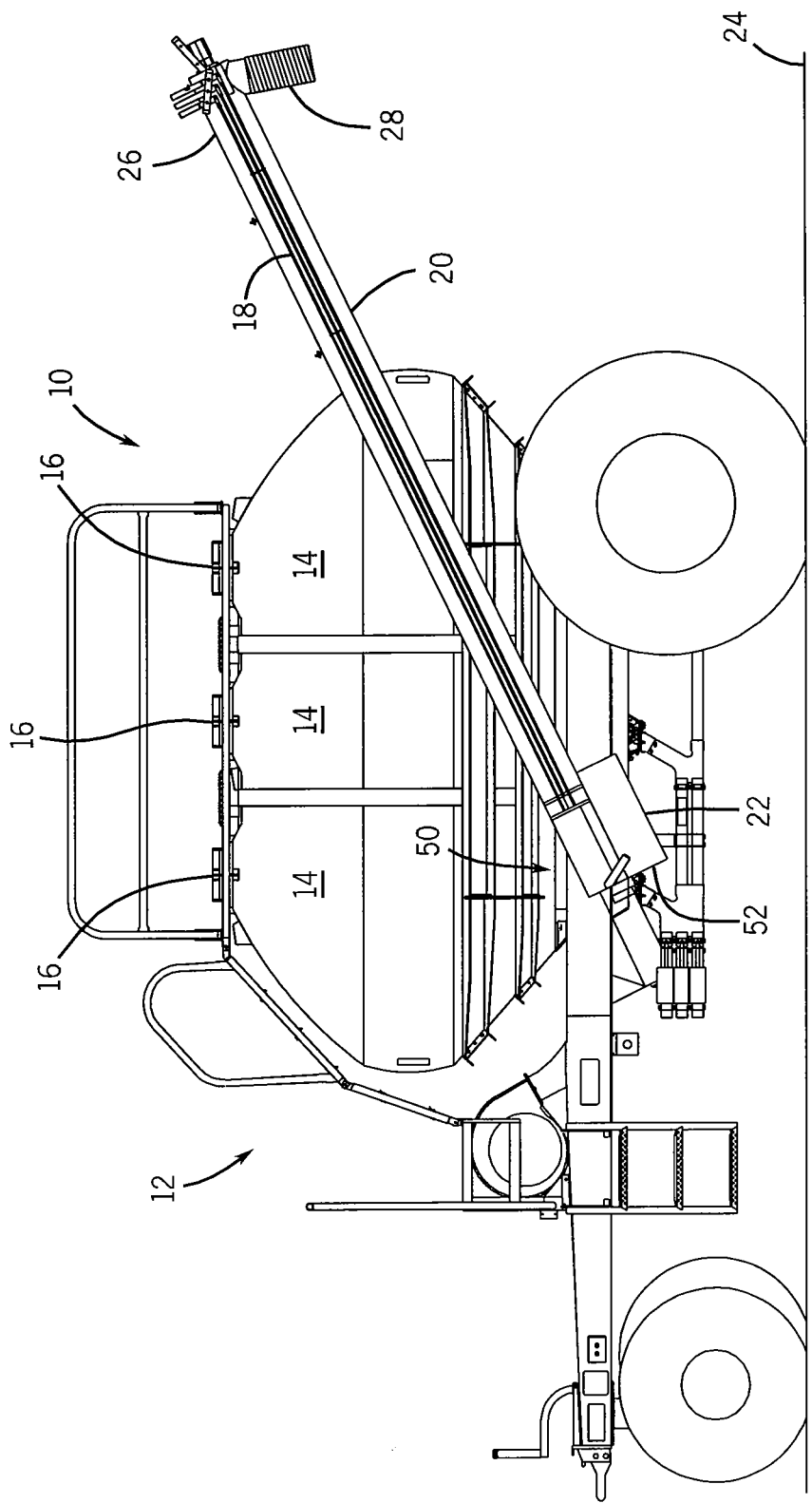
FIG. 1 is an isometric view of an air cart having a cart mounted conveyor apparatus in the transport position.
Figure 2:
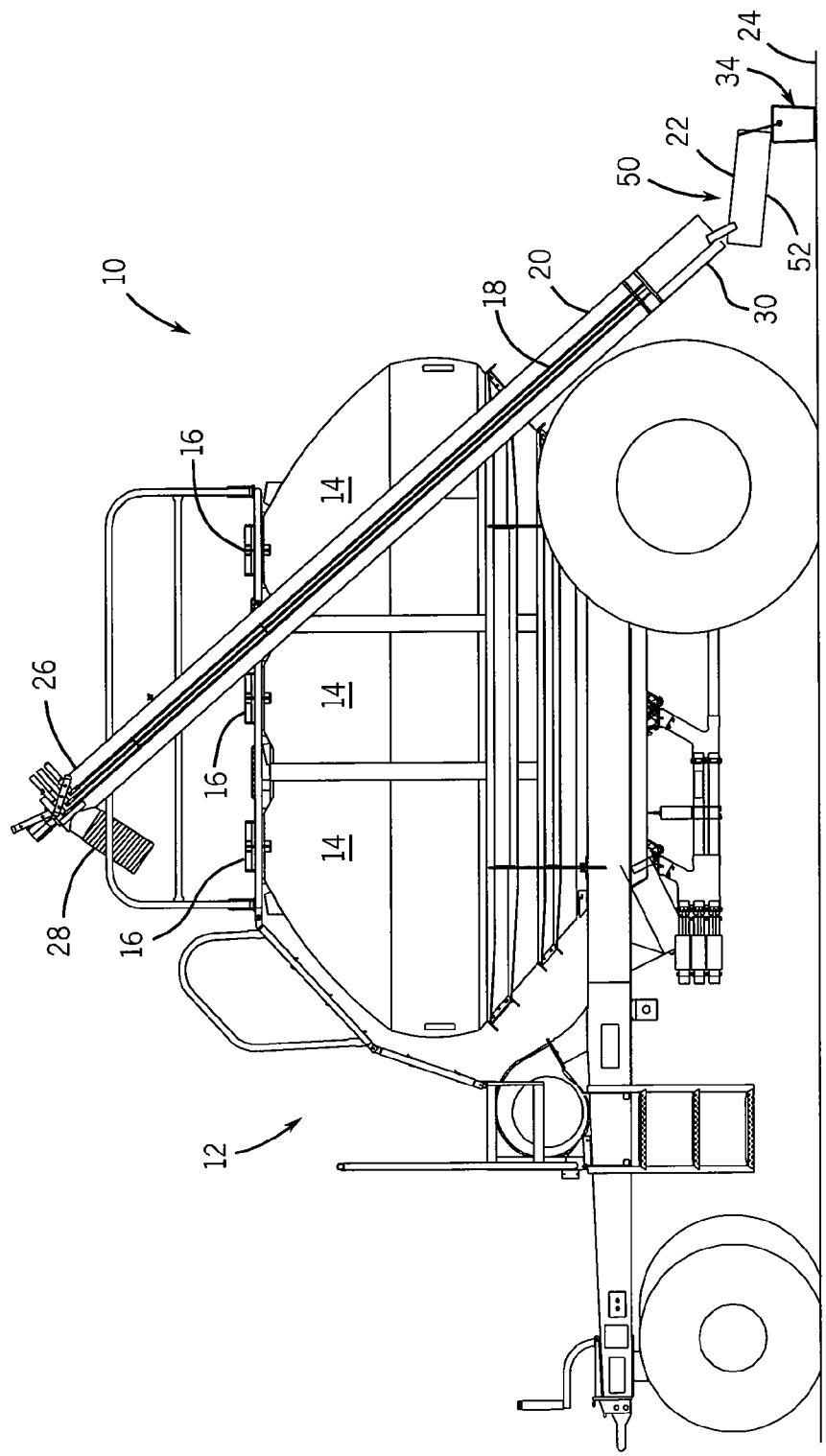
FIG. 2 is an isometric view of the air car with the cart mounted conveyor apparatus in the loading position.

FIGS. 1-2 illustrate a commodity cart loading conveyor apparatus 10 having a commodity cart 12 comprising a tank 14. In the illustrated example, the cart 12 has three tanks 14. It is understood however the cart 12 could have fewer than three tanks or more than three tanks. Each tank 14 has a fill hatch 16 located at a top portion of the cart 12. The cart 12 is typically attached to a seeding tool bar (not illustrated) that is operative to receive the agricultural commodities, e.g., seed and/or fertilizer, carried in the tank 14 through a system of air ducts, and deposit the material in the soil. Such carts are typically pulled either directly behind or sometimes directly ahead of such a tool bar.

The cart loading conveyor apparatus 10 has an auger 18 inside a conveyor tube 20. As known in the art, the conveyor tube 20 provides an elongate enclosure through which commodity can be conveyed from a fill hopper 22 to the fill hatch 16.

The conveyor tube 20 is mounted to the cart 12 such that the conveyor tube 20 can be moved from a transport position, shown in FIG. 1, to a filling position, shown in FIG. 2. In the transport position, the conveyor tube 20 is raised off the ground 24. In the filling position, the conveyor tube 20 is rotated outward and downward so that fill hopper 22 sits atop the ground 24. When the fill hopper 22 is sitting on the ground 24, commodity can be loaded into the fill hopper 22 from a transport vehicle (not shown). In the transport position, the conveyor tube 20 extends generally rearward with the fill hopper 22 raised above the ground 24. In the filling position, the upper (discharge) end 26 of the conveyor tube 20 is centered slightly above a fill hatch 16. In a preferred embodiment, the upper end 26 of the conveyor tube 20 includes a chute 28 that extends generally downward into the opening defined by the fill hatch 16. The conveyor tube 20 can be moved fore and aft to align the chute 28 with the fill hatch 16 of the tank 14 to be filled.

Figure 3:
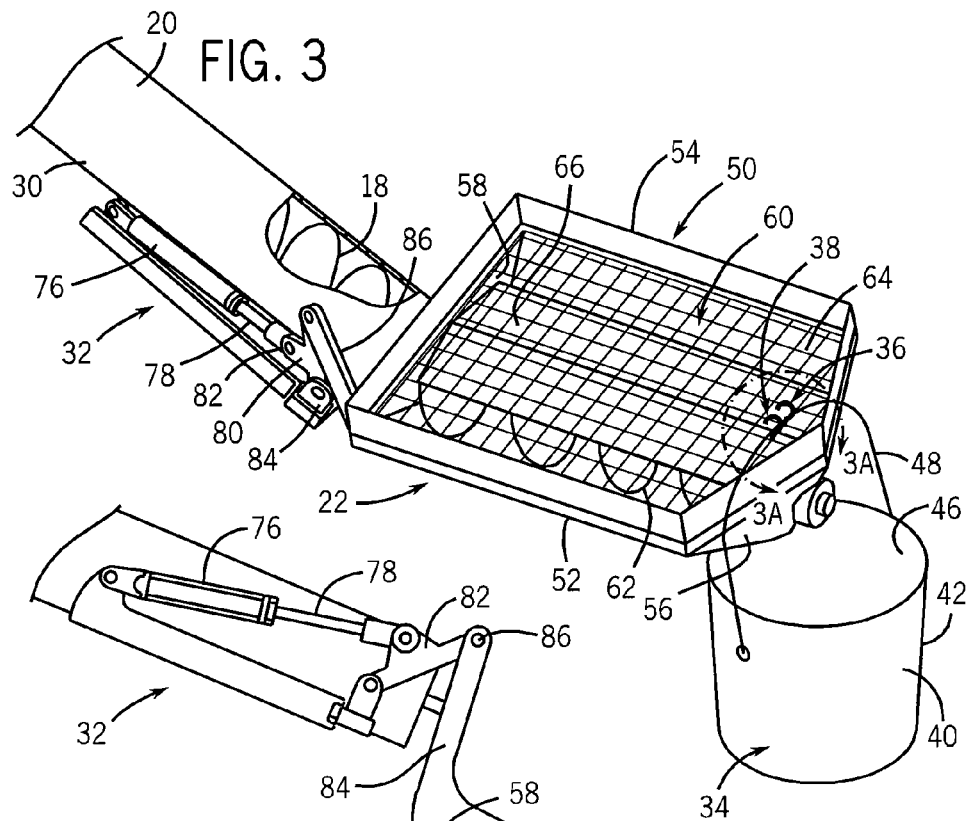
FIG. 3 is an enlarged view of a free end of the conveyor apparatus showing a fill hopper with a pail removably attached thereto according to the present invention.
Figure 3A:
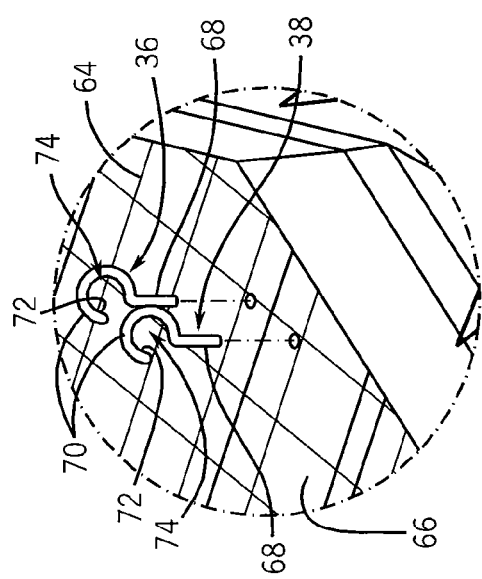
FIG. 3A is a partial exploded view of the fill hopper taken along line 3A-3A of FIG. 3.

With additional reference to FIGS. 3 and 3A, the fill hopper 22 is pivotally attached to the lower end 30 of the conveyor tube 20. An actuator 32 is interconnected between the lower end 30 of the conveyor tube 20 and the fill hopper 22, and is operable to pivot the fill hopper 22 away from the conveyor tube 20, as will be described more fully below, during emptying of the fill hopper 22.

Figure 4:
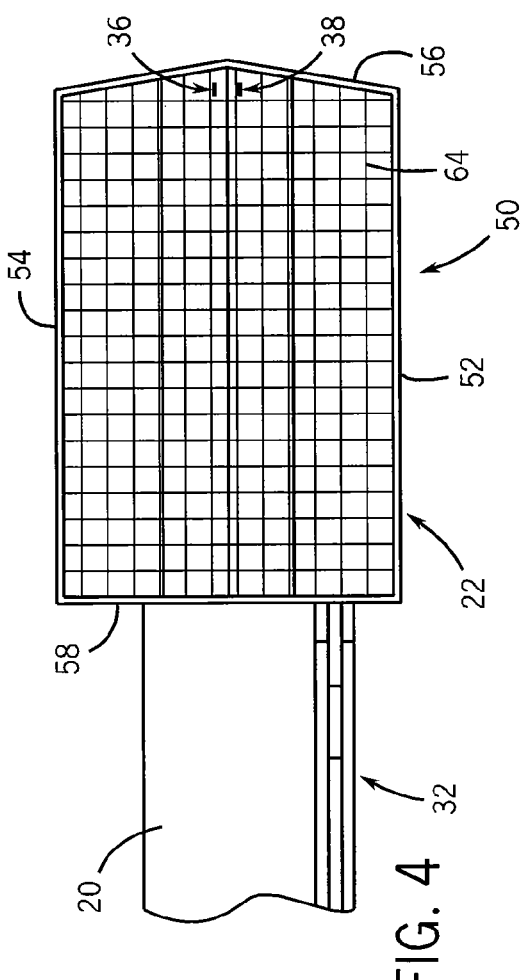
FIG. 4 is a top plan view of the fill hopper.
Figure 5:
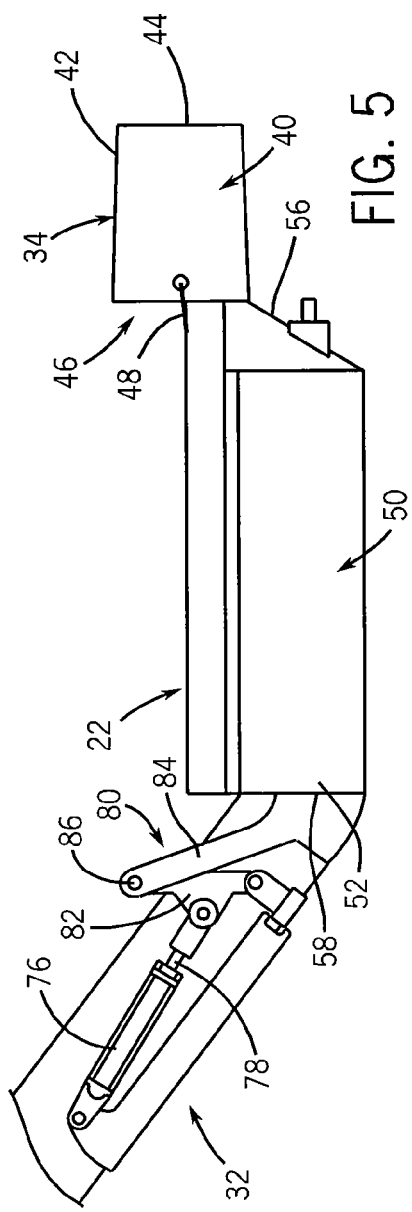
FIG. 5 is a side elevation view of the fill hopper in an operating position.

With additional reference to FIGS. 4 and 5, a container, which in the illustrated embodiment is a pail 34, is removably attached to the fill hopper 22 by a pair of hooks 36, 38. The pail 34 has a cylindrical container 40 defined by an annular wall 42 extending from a disc-shaped base 44 to an open end 46. Near the open end 46 of the cylindrical container 40 is attached a bail 48. The bail 48 is attached to the cylindrical container 40 in a conventional manner and thus is movable between a lowered position in which the bail 48 rests against the outer surface of the annular wall 42 or a raised position in which the bail 48 is centered above the open end 46, such as for carrying. The pail 34 can be mounted to the fill hopper 22 by hanging the bail 48 on the pair of hooks 36, 38.

The fill hopper 22 is comprised of a bin 50 defined by a pair of sidewalls 52, 54, front wall 56, and rear wall 58. The walls are interconnected to form an inverted tetrahedron shaped cavity 60. An auger 62 is rotatably mounted to the front wall 56 within the cavity 60 is operable to feed commodity from the bin 50 to the auger 18 in the conveyor tube 20. It is desirable that the intake for a conveyor be screened to sieve the commodity and prevent entry into the cart 12 of lumps or foreign objects that could plug the tubes that carry the commodity. Accordingly, a sieve screen or grate 64 is attached to the upper end of the bin 50.

Mounted just below the sieve screen 64 is a plate 66 to which the hooks 36, 38 are mounted. Each hook has a shank 68 that extends uprightly from the plate 66 to a bend 70 that turns downward to form a catch 72. A gape 74 is defined between the catch 72 and the shank 68, and is sized to receive the bail 48 when the pail 34 is hung on the fill hopper 22. The hooks extend through a respective space (not numbered) in the sieve screen 64. Additionally, the hooks 36, 38 are mounted to the plate 66 so that the distance therebetween results in the pail 34 being held snuggly against the front wall 56 of the bin 50 when the pail 34 is hooked onto the fill hopper 22, as best shown in FIG. 5. As further shown in FIG. 5, when the fill hopper 22 is in the filling position, e.g., the sieve screen 64 parallel to the ground 24, the pail 34 is also oriented parallel to the ground 24. That is, the open end 46 and the base 44 of the pail 34 are perpendicular to the ground 24.

Figure 6:
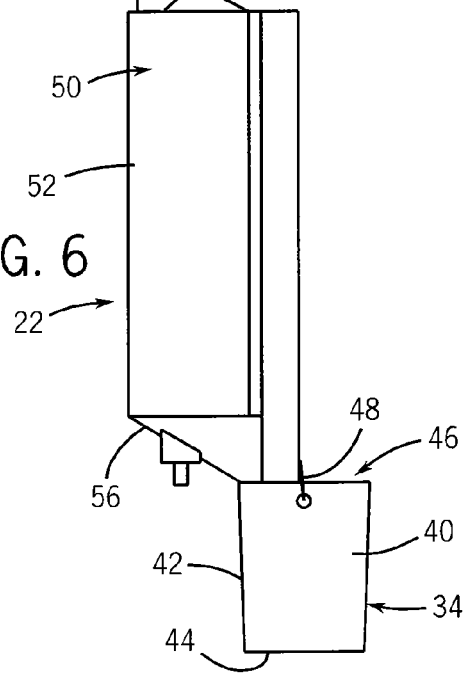
FIG. 6 is a side elevation view of the conveyor apparatus with fill hopper rotated to an upright position to place the hopper-mounted pail atop the ground.

The pail 34 latches tightly onto the bin 50 which holds the relative position of the pail 34 to the fill hopper 22 when the fill hopper 22 is rotated from the filling position shown in FIG. 5 to the upright position shown in FIG. 6. The fill hopper 22 is rotated relative to the conveyor tube 20 by actuator 32, which in one embodiment is a hydraulic acutator comprised of a hydraulic cylinder 76 and a ram 78. The ram 78 is connected to a linkage 80 that is connected to rear wall 58. The linkage 80 includes an inner arm 82 that is connected to the ram 78 and an outer arm 84 that is connected to the rear wall 58. The inner arm 82 is connected to the outer arm 84 by a pivot pin 86. Thus, as the ram 78 is extended, the outer arm 84 rotates downward (clockwise in the figure), which causes the bin 50 to be roated to a generally downward position. It will be appreciated that the conveyor tube 20 must be raised slightly to lift the fill hopper 22 off the ground 24 so that there is ample room between the fill hopper 22 and the ground 24 for the fill hopper 22 to rotate downward to vertically orient the fill hopper 22.

As also shown in FIG. 6, when the fill hopper 22 is rotated to the upright position, the base 44 of the pail 34 is parallel to the ground 24 and thus conveyor tube 20 can be lowered so that the pail 34 sits on the ground 24. In this position, the open end 46 of the pail 34 is effectively below the front wall 56 (lower wall in FIG. 6) of the bin 50, which allows residual commodity in the fill hopper 22 to flow by gravity and/or counter-rotation of auger 62 into the pail 34.

Turning now to FIG. 7, it is contemplated that the fill hopper 22 could be rotated further, which results in the fill hopper 22 being in an over-rotated or past-upright position but the pail 34 still securely seated on the ground 24. Permitting limited over-rotation of the fill hopper 22 may improve the capture of residual commodity from the fill hopper 22 by enabling any residual commodity that is sitting against the front wall 56 of the bin 50 to be gravitationally fed into the pail 34.

After the fill hopper 22 is emptied, the conveyor tube 20 may be lowered slightly so that the otherwise snug fit between the bail 48 and the hooks 36, 38 can be released. This allows a user to remove the bail 48 from engagement with the hooks 36, 38 and unhook the pail 34 from the fill hopper 22. The pail 34 can then be emptied and then hooked again to the fill hopper 22 or a new pail could be hooked to the fill hopper 22.

While the present invention has been described with respect to hooks for facilitating the temporary attachment of the pail to the fill hopper, it is understood that other types of latching structures could be used.

The present invention has been described in terms of the preferred embodiment, and it is recognized that equivalents, alternatives, and modifications, aside from those expressly stated, are possible and within the scope of the appending claims.

The invention claimed is:

1. A hopper of a commodity conveyor apparatus for use with an agricultural implement, the hopper comprising:
   a bin configured to hold a volume of a granular commodity, the bin movable between a first position at which the bin can be loaded with the granular commodity and a second position at which residual granular commodity can be recovered from the bin;
   a fill opening formed in the bin and adapted for loading the granular commodity into the bin when the bin is in the first position;
   a discharge opening configured to be flow-coupled to the commodity conveyor apparatus;
   a container removably attached to the bin for recovering the residual granular commodity from the bin when the bin is in the second position;
   a catch for removably attaching the container to the bin, the catch maintaining attachment of the container to the bin when the bin is moved from the first position to the position.

2. The hopper of claim 1 wherein the catch includes a hook mounted to the bin and wherein the container includes a bail that is retained by the book when the container is removably attached to the bin.

3. The hopper of claim 2 wherein the hook is mounted adjacent an upper end of the bin and is spaced from a sidewall of the bin so that the container is held snuggly against an upper end of the sidewall when the container is removably attached to the bin.

4. The hopper of claim 3 wherein the sidewall includes first and second angled wall members that intersect at a point along an axis that extends through the hook.

5. The hopper of claim 2 further comprising a grate attached to an upper end of the bin.

6. The hopper of claim 1 further comprising an auger positioned in the bin and operative to feed granular commodity to the discharge opening.

7. The hopper of claim 1 wherein the container is a pail having an annular sidewall extending between an open top and a closed bottom, and wherein the closed bottom is configured to sit upon the ground when the bin is in the second position.

8. The hopper of claim 1 further comprising a tilting actuator coupled to the bin and operative to move the bin between the first and the second positions.

9. A commodity conveying apparatus for use with an air seeding implement, comprising:
   a conveyor having an intake end for receiving a granular commodity and a discharge end for passing the granular commodity into a seed hopper of the air seeding implement;
   a feed hopper pivotally attached to the intake end of the conveyor, the feed hopper pivotal between a commodity conveying position and a commodity recapture position that is upright relative to the commodity conveying position;
   a container having a handle; and
   a catch that captures the handle for removably attaching the container to the feed hopper, and wherein the catch maintains attachment of the container to the feed hopper when the feed hopper is pivoted from the conveying position to the recapture position.

10. The commodity conveying apparatus of claim 9 further comprising an actuator interconnected between the conveyor and the feed hopper, and operative to pivot the feed hopper between the commodity conveying position and the commodity recapture position.

11. The commodity conveying apparatus of claim 10 wherein the conveyor includes a hollow tube with an auger disposed therein, and wherein the actuator has a first end attached to an exterior surface of the hollow tube and a second end attached to the feed hopper.

12. The commodity conveying apparatus of claim 10 wherein the actuator includes a hydraulic cylinder.

13. The commodity conveying apparatus of claim 10 wherein the actuator provides at least forty-five degrees of motion for the feed hopper between the commodity conveying position and the commodity recapturing position.

14. The commodity conveying apparatus of claim 13 wherein the actuator provides greater than forty-five degrees of motion for the feed hopper between the commodity conveying position and the commodity recapturing position.

15. The commodity conveying apparatus of claim 9 wherein the catch includes a pair of hooks mounted to the feed hopper.

16. The commodity conveying apparatus of claim 9 wherein the container is held adjacent an input opening of the feed hopper when the handle is captured by the catch.

17. A method of recapturing residual granular commodity from a feed hopper of a conveying apparatus of an air seeding implement, comprising:
   removably attaching a container to the feed hopper with a catch, the container having an annular wall extending between an open top and a closed bottom surface collectively defining an annular interior; and
   tilting the feed hopper to an inclined position in which the closed bottom surface of the container rests atop the ground and residual granular commodity in the feed hopper falls through the open top of the container and into the annular interior of the container;
   wherein the catch maintains attachment of the container to the feed when the feed hopper is tilted to the inclined position.

18. The method of claim 17, wherein tilting includes rotating the feed hopper from a horizontal position to an upright position that is at least ninety degrees from the horizontal position.

19. A hopper of a commodity conveyor apparatus for use with an agricultural implement, the hopper comprising:
   a bin configured to hold a volume of a granular commodity, the bin movable between a first position at which the bin can be loaded with the granular commodity and a second position at which residual granular commodity can be recovered from the bin;
   a fill opening formed in the bin and adapted for loading the granular commodity into the bin when the bin is in the first position;
   a discharge opening configured to be flow-coupled to the commodity conveyor apparatus;
   a container removably attached to the bin for recovering the residual granular commodity from the bin when the bin is in the second position;
   a hook mounted to the bin; and
   a grate attached to an upper end of the bin;
   wherein:
      the container includes a bail that is retained by the hook when the container is removably attached to the bin;
      the bin includes a mounting plate spanning across an upper portion of the bin;
      the hook is mounted to the mounting plate; and
      the mounting plate is positioned beneath the grate.

20. The hopper of claim 19 wherein the hook extends from the mounting plate through an opening in the grate.

* * * * *